(12) United States Patent
Yin et al.

(10) Patent No.: US 12,063,057 B2
(45) Date of Patent: Aug. 13, 2024

(54) SIGNAL COUPLER

(71) Applicant: NXP USA, INC., Austin, TX (US)

(72) Inventors: Yi Yin, Munich (DE); Birama Goumballa, Larra (FR)

(73) Assignee: NXP USA, Inc., Austin, TX (US)

( * ) Notice: Subject to any disclaimer, the term of this patent is extended or adjusted under 35 U.S.C. 154(b) by 386 days.

(21) Appl. No.: 17/648,967

(22) Filed: Jan. 26, 2022

(65) Prior Publication Data

US 2022/0247442 A1    Aug. 4, 2022

(30) Foreign Application Priority Data

Jan. 29, 2021   (EP) ..................... 21305124

(51) Int. Cl.
*H01P 5/18*   (2006.01)
*H04B 1/18*   (2006.01)
*H04B 3/56*   (2006.01)
*H04L 25/02*  (2006.01)

(52) U.S. Cl.
CPC ............... *H04B 1/18* (2013.01); *H04B 3/56* (2013.01); *H04L 25/0226* (2013.01)

(58) Field of Classification Search
CPC ... H04B 1/04; H04B 1/16; H04B 1/18; H04B 3/56; H04L 25/0226; H01P 5/16; H01P 5/18; H01P 5/184; H01P 5/22
See application file for complete search history.

(56) References Cited

U.S. PATENT DOCUMENTS

| | | | | |
|---|---|---|---|---|
| 4,375,053 A | * | 2/1983 | Viola | H01Q 3/40 333/116 |
| 5,689,217 A | * | 11/1997 | Gu | H01P 5/187 333/116 |
| 5,742,210 A | * | 4/1998 | Chaturvedi | H01P 5/185 333/116 |

(Continued)

OTHER PUBLICATIONS

Djordjevic, A., "Wideband Multilayer Directional Coupler with Tight Coupling and High Directivity", 2012 Wiley Periodicals, Inc. Microwave Opt Technol Lett 54:2261-2267, 2012; View this article online at wileyonlinelibrary.com. DOI 10.1002/mop.27051, Jan. 2012.

(Continued)

*Primary Examiner* — Blane J Jackson

(57) ABSTRACT

A signal coupler (100) comprising: a main-transmission-line (114) that extends in a longitudinal direction within a substrate (102) between an input port and an output port; and a coupled-transmission-line (116) that extends in the longitudinal direction within the substrate (102) between a coupled port and a termination port. The coupled-transmission-line (116) is in a second layer (110). The main-transmission-line (114) comprises a first-portion (120) in a first layer (108), a second-portion (122) in a second layer (110), and a third-portion (124) in a third layer (112). At least part of the first-portion (120) is spaced apart from the coupled-transmission-line (116) in a depth direction. At least part of the second-portion (122) is spaced apart from the coupled-transmission-line (116) in the depth direction. At least part of the third-portion (124) is spaced apart from the coupled-transmission-line (116) in the depth direction.

20 Claims, 9 Drawing Sheets

(56) References Cited

U.S. PATENT DOCUMENTS

| | | | |
|---|---|---|---|
| 6,208,220 B1* | 3/2001 | Logothetis | H01P 5/187 333/116 |
| 6,825,738 B2 | 11/2004 | Shumovich | |
| 7,088,021 B2* | 8/2006 | Kobayashi | H02K 9/19 310/52 |
| 8,299,871 B2* | 10/2012 | Carrillo-Ramirez | H01P 5/187 333/116 |
| 2001/0043130 A1* | 11/2001 | Nagamori | H01P 5/185 333/101 |
| 2011/0199166 A1 | 8/2011 | Carrilo-Ramirez | |

OTHER PUBLICATIONS

Fahmi, M., "Multilayer Multi-Section Broadband LTCC Stripline Directional Couplers", Microwave Symposium, IEEE MTT-S International, pp. 173-176, Jun. 3, 2007.

Piekarz, I., "Wideband Three-Section Symmetrical Coupled-Line Directional Coupler Operating in Differential Mode", IEEE Microwave and Wireless Components Letters, vol. 28, No. 6, Jun. 2018.

Staszek, K., "Rigorous Approach for Design of Differential Coupled-Line Directional Couplers Applicable in Integrated Circuits and Substrate-Embedded Networks", Scientific Reports, vol. 6, No. 1, Apr. 26, 2016.

Zhu, Y., "A 10-40 GHz 7 dB Directional Coupler in Digital CMOS Technology", Microwave Symposium Digest, IEEE MTT-S International, pp. 1551-1554, Jun. 11, 2006.

\* cited by examiner

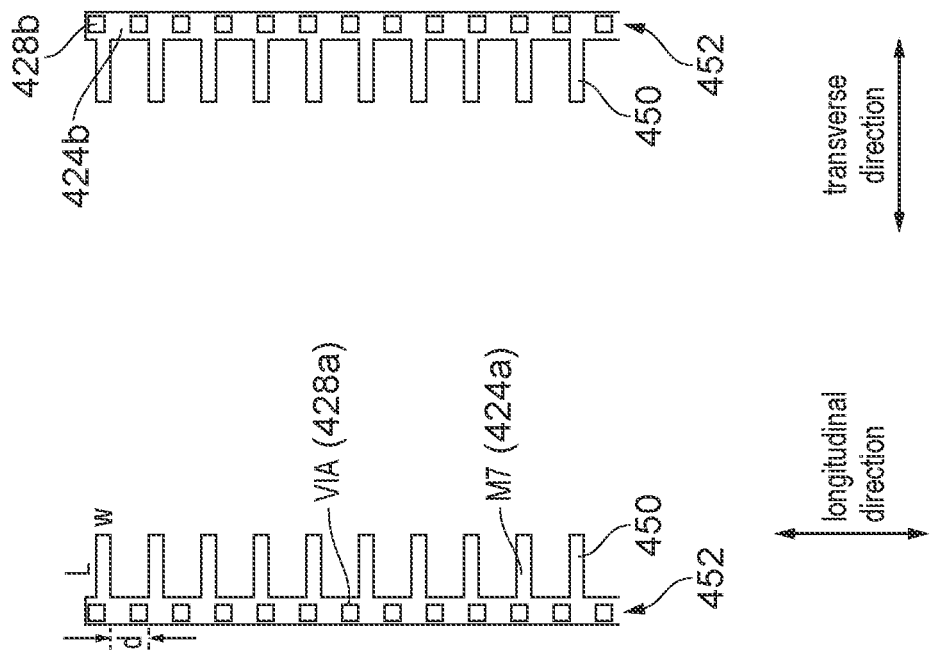
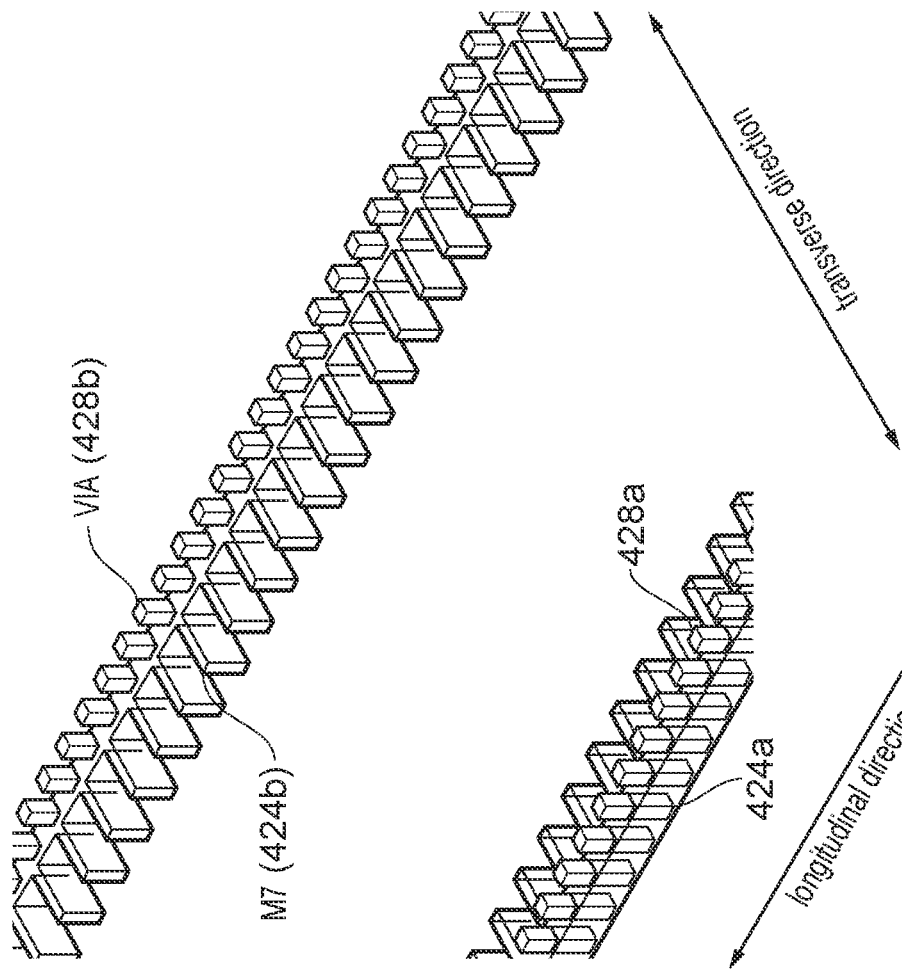
FIG. 4C
FIG. 4B

SIGNAL COUPLER

CROSS-REFERENCE TO RELATED APPLICATIONS

This application claims the priority under 35 U.S.C. § 119 of European Patent application no. 21305124.6, filed on 29 Jan. 2021, the contents of which are incorporated by reference herein.

FIELD

The present disclosure relates to a signal coupler, and in particular to a signal coupler that is suitable for coupling high frequency signals such as those having a microwave frequency.

SUMMARY

According to a first aspect of the present disclosure there is provided a signal coupler comprising:
  a substrate having a first surface and an opposite second surface, and defining a thickness therebetween, wherein the substrate comprises:
    a depth direction that is through the thickness of the substrate;
    a longitudinal direction that is orthogonal to the depth direction;
    a transverse direction that is orthogonal to the depth direction, and is also orthogonal to the longitudinal direction;
    a first layer;
    a second layer that is located between the first layer and the second surface; and
    a third layer that is located between the second layer and the second surface;
  an input port;
  an output port;
  a coupled port;
  a termination port;
  a main-transmission-line that extends in the longitudinal direction within the substrate between the input port and the output port; and
  a coupled-transmission-line that extends in the longitudinal direction within the substrate between the coupled port and the termination port;
  wherein:
    the main-transmission-line and the coupled-transmission-line are electromagnetically coupled to each other;
    the coupled-transmission-line is in the second layer; and
    the main-transmission-line comprises a first-portion in the first layer, a second-portion in the second layer, and a third-portion in the third layer, wherein the first-portion, the second-portion and the third-portion are galvanically connected together, such that:
      at least part of the first-portion of the main-transmission-line is spaced apart from the coupled-transmission-line in the depth direction in order to provide electromagnetic coupling between the main-transmission-line and the coupled-transmission-line;
      at least part of the second-portion of the main-transmission-line is spaced apart from the coupled-transmission-line in the depth direction in order to provide electromagnetic coupling between the main-transmission-line and the coupled-transmission-line; and
      at least part of the third-portion of the main-transmission-line is spaced apart from the coupled-transmission-line in the depth direction in order to provide electromagnetic coupling between the main-transmission-line and the coupled-transmission-line.

Advantageously, such a signal coupler can achieve high coupler directivity and low insertion loss for signal transmission, with a reduced size of the coupler device and low variation of the coupling factor.

In one or more embodiments, the substrate further comprises:
  a ground plane that is parallel with the first surface, and is located between the third layer and the second surface.

In one or more embodiments, in the transverse direction:
the first-portion of the main-transmission-line at least partially overlaps the coupled-transmission-line.

In one or more embodiments, in the transverse direction:
the first-portion of the main-transmission-line overlaps the entire coupled-transmission-line.

In one or more embodiments, in the depth direction:
the second-portion of the main-transmission-line overlaps the entire coupled-transmission-line.

In one or more embodiments, in the depth direction:
the main-transmission-line overlaps the entire coupled-transmission-line, and also extends beyond the coupled-transmission-line in both: a direction towards the first surface of the substrate; and a direction towards the second surface of the substrate.

In one or more embodiments, in the transverse direction:
at least part of the third-portion of the main-transmission-line does not overlap the coupled-transmission-line.

In one or more embodiments:
the second-portion of the main-transmission-line comprises two second-sub-portions that are respectively spaced apart from opposite sides of the coupled-transmission-line in the transverse direction in order to each provide electromagnetic coupling between the main-transmission-line and the coupled-transmission-line; and
the third-portion of the main-transmission-line comprises two third-sub-portions that are spaced apart from opposite sides of the coupled-transmission-line in the transverse direction.

In one or more embodiments:
the main-transmission-line comprises:
  a positive-main-transmission-line and a negative-main-transmission-line that are spaced apart from each other in the transverse direction, and are for conducting differential signalling;
the coupled-transmission-line comprises:
  a positive-coupled-transmission-line and a negative-coupled-transmission-line for receiving coupled differential signalling from the main-transmission-line;
the positive-coupled-transmission-line and the negative-coupled-transmission-line are in the second layer, and are spaced apart from each other in the transverse direction;
the positive-main-transmission-line and the negative-main-transmission-line each comprise:
  a first-sub-portion in the first layer, that is spaced apart from the coupled-transmission-line in the depth direction;
  a second-sub-portion in the second layer that is spaced apart from one side of the coupled-transmission-line in the transverse direction in order to provide electromagnetic coupling between the main-transmission-line and the coupled-transmission-line;
a third-sub-portion in the third layer that is spaced apart from a respective one of the positive-coupled-transmission-line and the negative-coupled-transmission-line in the depth direction in order to provide electromagnetic coupling between the main-transmission-line and the coupled-transmission-line.

In one or more embodiments, each of the third sub-portions include a longitudinally extending section and a plurality of transversely extending fingers.

In one or more embodiments, the fingers extend in a transverse direction inwardly, away from the longitudinally extending section.

In one or more embodiments:
the fingers of the third-sub-portion of the positive-main-transmission-line extend towards the third-sub-portion of the negative-main-transmission-line; and
the fingers of the third-sub-portion of the negative-main-transmission-line extend towards the third-sub-portion of the positive-main-transmission-line.

In one or more embodiments, in the transverse direction, the fingers of the third-portions do not overlap the positive-coupled-transmission-line or the negative-coupled-transmission-line.

In one or more embodiments, the substrate comprises a silicon wafer or a multi-layer printed circuit board.

In one or more embodiments, the signal coupler is suitable for coupling signals having a frequency that is greater than 300 MHz.

There is also provided a radar system, such as a car radar system, comprising any signal coupler disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:

FIG. 4B shows a perspective view of some of the features of FIG. 4A;

FIG. 4C shows a plan view of the features of FIG. 4B; and

DETAILED DESCRIPTION

Signal couplers can be used to couple an amount of electromagnetic energy in a main signal transmission line to a coupled signal transmission line, such that the signal can be single-ended or differential on the single-ended or differential coupled transmission line and can be used in another circuit. For example, signal couplers can be used to monitor transmitted power or to realize RFBist (radio frequency (RF) built-in-self test) functionality.

Especially for high frequency signal couplers, such as those that couple microwave signals, there is a demand for the coupler to have a small size, low insertion loss and high directivity. These demands are particularly relevant for microwave couplers that are used in a car radar system. Such car radar systems can be provided as part of an autonomous driving system that relies on radar systems to detect pedestrians and other objects.

A directional signal coupler can have high directivity by using ¼ lambda transmission lines. However, in some applications the use of ¼ lambda transmission lines can be unacceptably limiting because it results in the signal coupler being too big and occupying an unacceptably large area on an integrated circuit (IC). Also, such transmission lines can have unacceptably high insertion loss for signal transmission.

Figure 1:
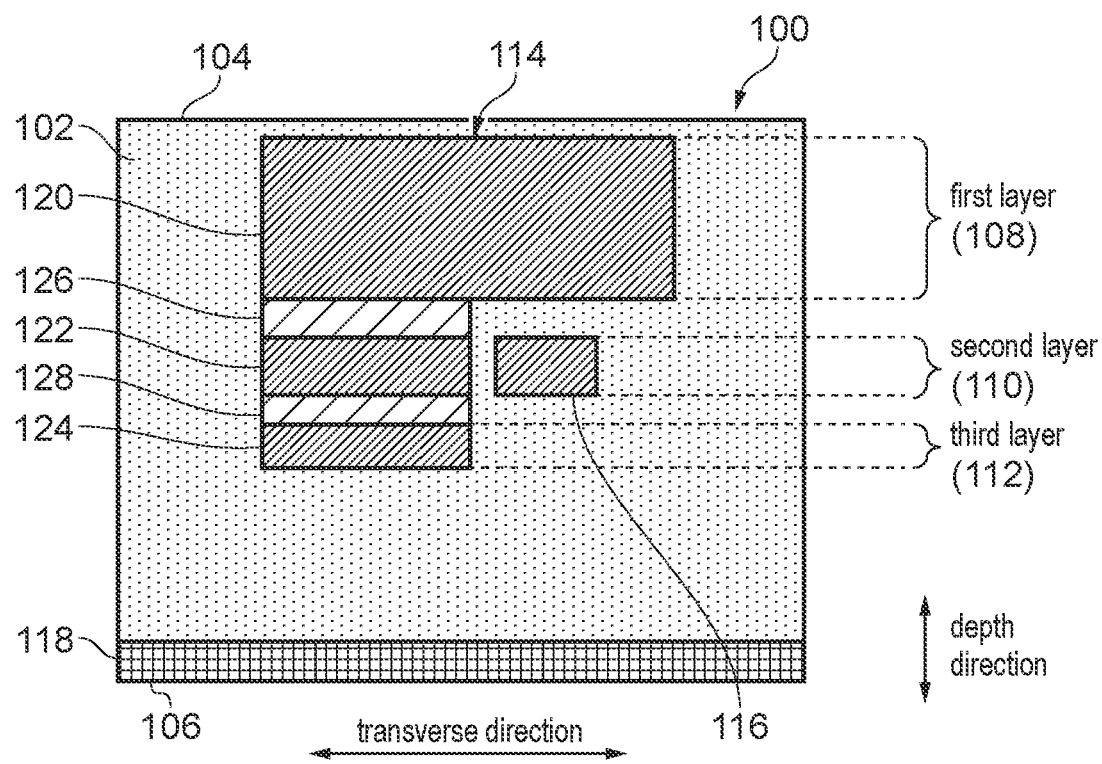
FIG. 1 shows a cross-sectional view of an example embodiment of a signal coupler according to the present disclosure.

FIG. 1 shows a cross-sectional view of an example embodiment of a signal coupler 100 according to the present disclosure.

The signal coupler 100 includes an isolated substrate 102. The substrate 102 can be part of an integrated circuit, and for instance can be a silicon wafer. Alternatively, the substrate 102 can be a FR4 of a multi-layer printed circuit board (PCB) in other examples. The substrate 102 has a first surface 104 and an opposite second surface 106. As it is shown in FIG. 1, the first surface 104 is the upper surface and the second surface is 106 is the lower surface. The first surface 104 is parallel with the second surface 106 in this example. The substrate 102 has a thickness that is defined between the first surface 104 and the second surface 106. In order to assist with the description of the signal coupler 100, the substrate 102 is described as having: i) a depth direction that is through the thickness of the substrate 102, and orthogonal to the plane of the first surface 104 (a vertical direction in FIG. 1); a longitudinal direction (into and out of the page in FIG. 1) that is orthogonal to the depth direction; and a transverse direction (a horizontal direction in FIG. 1) that is orthogonal to the depth direction, and is also orthogonal to the longitudinal direction. As will be discussed below, signals pass along conductors through the substrate 102 in the longitudinal direction—that is, into or out of the page for the signal coupler 100 as it is shown in FIG. 1.

The coupler 100 includes a first layer 108, a second layer 110 and a third layer 112 in a substrate 102. Each of these three layers includes, or can include, an electrically conductive material in order to communicate electrical signals. These three layers 108, 110, 112 may be pre-allocated metal layers, such as in a silicon wafer of an integrated circuit (as shown in in FIG. 6). The three layers 108, 110, 112 may be different layers in a multi-layer PCB. In many examples, the three layers 108, 110, 112 may be separated by electrically non-conductive layers which can provide the functionality of a dielectric.

In an alternative implementation, the three layers 108, 110, 112 may not be structurally or functionally distinct from each other, but instead may simply be considered as different regions of a volume of material that has consistent properties throughout the material.

In this example, the first layer 108 is parallel with the first surface 104, and is the closest electrically conductive layer to the first surface 104. The second layer 110, which is also parallel with the first surface 104, is located between the first layer 108 and the second surface 106. The third layer 112, which again is parallel with the first surface 104, is located between the second layer 110 and the second surface 106.

The signal coupler 100 also includes four ports that are not visible in FIG. 1. (Similar ports are visible in FIG. 3B, and will be described further with respect to FIG. 3B below.) The four parts are:
- an input port, which is located at a first longitudinal end of the substrate 102;
- an output port, which is located at a second longitudinal end of the substrate 102;
- a coupled port, which is located at the first longitudinal end of the substrate 102; and
- a termination port, which is located at the second longitudinal end of the substrate 102.

The input port can be located in the first layer 108 at the first longitudinal end of the substrate 102. The output port can be located in the first layer 108 at the second longitudinal end of the substrate 102. The coupled port can be located in the second layer 110 at the first longitudinal end of the substrate 102. The termination port can be located in the second layer 110 at the second longitudinal end of the substrate 102.

A main-transmission-line 114 extends in the longitudinal direction within the substrate 102 between the input port and the output port. For example, the main-transmission-line 114 can be for carrying the electrical signal that is to be monitored or tested from the input port to the output port of the signal coupler 100. A coupled-transmission-line 116 extends in the longitudinal direction within the substrate 102 between the coupled port and the termination port. A proportion of the electrical signal on the main-transmission-line 114 is coupled into the coupled-transmission-line 116, such that a coupled signal is available for further processing at the coupled port. To this end, the main-transmission-line 114 and the coupled-transmission-line 116 are electromagnetically coupled to each other, but not galvanically connected to each other. A dielectric material can be located between the main-transmission-line 114 and the coupled-transmission-line 116 to galvanically isolate the signals from each other and assist with the capacitive coupling.

The main-transmission-line 114 and the coupled-transmission-line 116 in this example have a constant size and shape along their longitudinal length.

The substrate 102 in this example also includes a ground plane 118. This ground plane 118 is a common ground reference for both the main-transmission-line 114 and the coupled-transmission-line 116 in this example. The ground plane 118 is parallel with the first surface 104, and is located between the third layer 112 and the second surface 106. In this example, the ground plane 118 is located adjacent to the second surface 106. It will be appreciated that there could be one more additional layers between the third layer 112 and the ground plane 118.

As shown in FIG. 1, the coupled-transmission-line 116 is in the second layer 110. The coupled-transmission-line 116 can be implemented as a microstrip, which is a convenient and well-established way of providing a transmission line, in a silicon substrate in particular.

The main-transmission-line 114 includes a first-portion 120 in the first layer 108, a second-portion 122 in the second layer 110, and a third-portion 124 in the third layer 112. The first-portion 120, the second-portion 122 and the third-portion 124 are all galvanically connected together, in this example using vias 126, 128 between the layers.

At least part of the first-portion 120 of the main-transmission-line 114 is spaced apart from the coupled-transmission-line 116 in the depth direction in order to provide electromagnetic coupling between the main-transmission-line 114 and the coupled-transmission-line 116. The majority of this electromagnetic coupling can be in the depth direction.

In the transverse direction, the first-portion 120 of the main-transmission-line 114 at least partially overlaps the coupled-transmission-line 116. In this example, the first-portion 120 of the main-transmission-line 114 overlaps the entire coupled-transmission-line 116 in the transverse direction. That is, the first-portion 120 of the main-transmission-line 114 extends over the entire transverse width of the coupled-transmission-line 116 in the plane of the substrate 102. This can enable strong electromagnetic coupling between the main-transmission-line 114 and the coupled-transmission-line 116 in the depth direction to be achieved.

At least part of the second-portion 122 of the main-transmission-line 114 is spaced apart from the coupled-transmission-line 116 in the transverse direction in order to provide electromagnetic coupling between the main-transmission-line 114 and the coupled-transmission-line 116. The majority of this electromagnetic coupling can be in the transverse direction.

At least part of the third-portion 124 of the main-transmission-line 114 is spaced apart from the coupled-transmission-line 116 in the depth direction in order to provide electromagnetic coupling between the main-transmission-line 114 and the coupled-transmission-line 116. It is recalled that the third portion 124 of the main-transmission-line 114 is in a different layer to the coupled-transmission-line 116. Having the main-transmission-line 114 extend deeper into the substrate 102 than the coupled-transmission-line 116 can increase the transverse/broadside electromagnetic coupling between the transmission lines 114, 116 and therefore enable a compact signal coupler 100 to be provided.

Also, in this example, the third-portion 124 of the main-transmission-line 114 does not overlap (and in some implementation can be spaced apart from) the coupled-transmission-line 116 in the transverse direction. This can enable the coupled-transmission-line 116 to be sufficiently well coupled to the ground plane 118 such that any losses in the coupled-transmission-line 116 can be considered acceptably low.

In this example, in the depth direction, the main-transmission-line 114 overlaps the entire coupled-transmission-line 116, and also extends beyond the coupled-transmission-line 116 both: a direction towards the first surface 104 of the substrate 102; and a direction towards the second surface 106 of the substrate 102. In this implementation, in the depth direction, the second-portion 126 of the main-transmission-line 114 is aligned with, and overlaps the entire, coupled-transmission-line 116.

Advantageously, the signal coupler 100 of FIG. 1 can achieve high coupler directivity and low insertion loss for signal transmission, with a reduced size of the coupler device and low variation of the coupling factor. This can be achieved, at least in part, by incorporating both edge-coupled (in the transverse direction) and broadside-coupled (in the depth direction) transmission lines.

Figure 2:
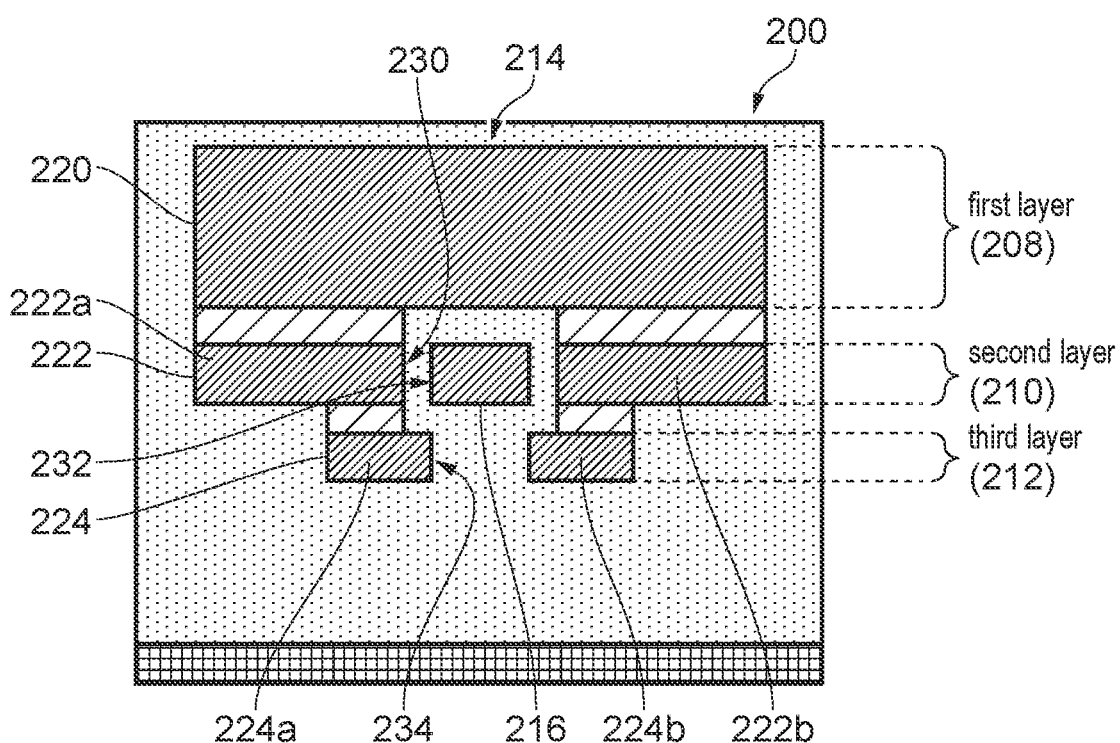
FIG. 2 shows a cross-sectional view of another example embodiment of a signal coupler according to the present disclosure.

FIG. 2 shows a cross-sectional view of another example embodiment of a signal coupler 200 according to the present disclosure. Features of FIG. 2 that are also shown in FIG. 1 will be given corresponding reference numbers in the 200 series, and will not necessarily be described in detail again here. In FIG. 1, the main-transmission-line extends down one transverse side of the coupled-transmission-line. As will be described below, in FIG. 2 the main-transmission-line 214 has separate sub-portions that extend alongside both transverse sides of the coupled-transmission-line 216. This can further increase the transverse electromagnetic coupling between the main-transmission-line 214 and the coupled-transmission-line 216, and can therefore further reduce the length of the signal coupler 200.

In the same way as FIG. 1, the main-transmission-line 214 includes a first-portion 220 in the first layer 208, a second-portion 222 in the second layer 210, and a third-portion 224 in the third layer 212. In FIG. 2, however, the second-portion 222 of the main-transmission-line 214 comprises two second-sub-portions 222a, 222b, and the third-portion 224 of the main-transmission-line 214 comprises two third-sub-portions 224a, 224b.

The two second-sub-portions 222a, 222b of the main-transmission-line 214 are respectively spaced apart from opposite sides of the coupled-transmission-line 216 in the transverse direction in order to each provide electromagnetic coupling between the main-transmission-line 214 and the coupled-transmission-line 216 in the transverse direction.

Similarly, the two third-sub-portions 224a, 224b of the main-transmission-line 214 are spaced apart from respective opposite sides of the coupled-transmission-line 216 in the transverse direction in order to each provide electromagnetic coupling between the main-transmission-line 214 and the coupled-transmission-line 216. This electromagnetic coupling is in the depth direction because the third-sub-portions 224a, 224b of the main-transmission-line 214 are in a deeper layer than the coupled-transmission-line 216. Also, in this example the electromagnetic coupling is in the transverse direction because the third-sub-portions 224a, 224b do not overlap with the coupled-transmission-line 216 in the transverse direction.

As shown in FIG. 2, each of the second-sub-portions 222a, 222b has a width (in the transverse direction) that is smaller than the width of the first portion 220. Also, each of the third-sub-portions 224a, 224b has a width that is smaller than the width of each of the second-sub-portions 222a, 222b.

In the example of FIG. 2, the first portion 220 of the main-transmission-line 214 has a thickness (in the depth direction) that is greater than the thickness of the coupled-transmission-line 216. This can be beneficial for reducing the signal losses in the main-transmission-line 214.

The second-sub-portions 222a, 222b of the main-transmission-line 214 are spaced apart from the coupled-transmission-line 216, which is also in the second layer 210, in the transverse direction. Each of the second-sub-portions 222a, 222b has an inward-facing surface 230 that is in a plane that is parallel with the depth direction and the longitudinal direction, and that faces the coupled-transmission-line 216. Similarly, the coupled-transmission-line 216 has two outward-facing surfaces 232 that are each in a plane that is parallel with the depth direction and the longitudinal direction, and that respectively face each of the second-sub-portions 222a, 222b of the main-transmission-line 214. The inward-facing surface 230 of each of the second-sub-portions 222a, 222b is spaced apart from a respective one of the outward-facing surfaces 232 of the coupled-transmission-line 216 in the transverse direction.

Since the third-sub-portions 224a, 224b of the main-transmission-line 214 are in a different layer to the coupled-transmission-line 216, they do not need to be spaced apart from the coupled-transmission-line 216 in a transverse direction in order to achieve galvanic isolation between the transmission lines. Each of the third-sub-portions 224a, 224b has an inward-facing surface 233 that is in a plane that is parallel with the depth direction and the longitudinal direction, and that is closest to the centre of the coupled-transmission-line 216./signal coupler 200 in a transverse direction. In this example, the inward-facing surface 233 of each of the respective third-sub-portions 224a, 224b is closer to the centre (in a transverse direction) than the inward-facing surface 230 of the corresponding second-sub-portions 222a, 222b. Such a profile can further improve the electromagnetic coupling between the main-transmission-line 214 and the coupled-transmission-line 216.

Figure 3A:
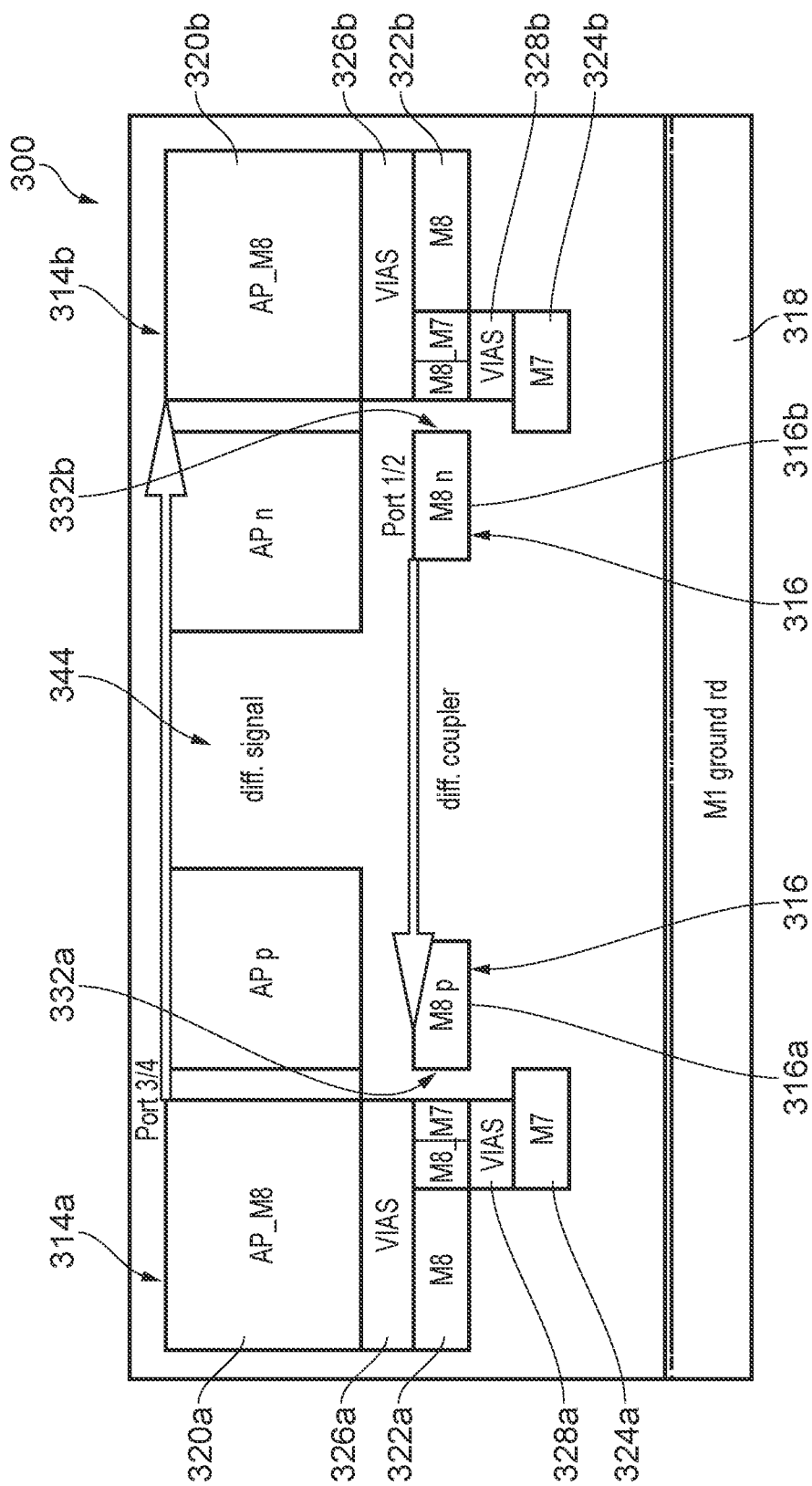
FIG. 3A shows a cross-sectional view of another example embodiment of a differential signal coupler according to the present disclosure.
Figure 3B:
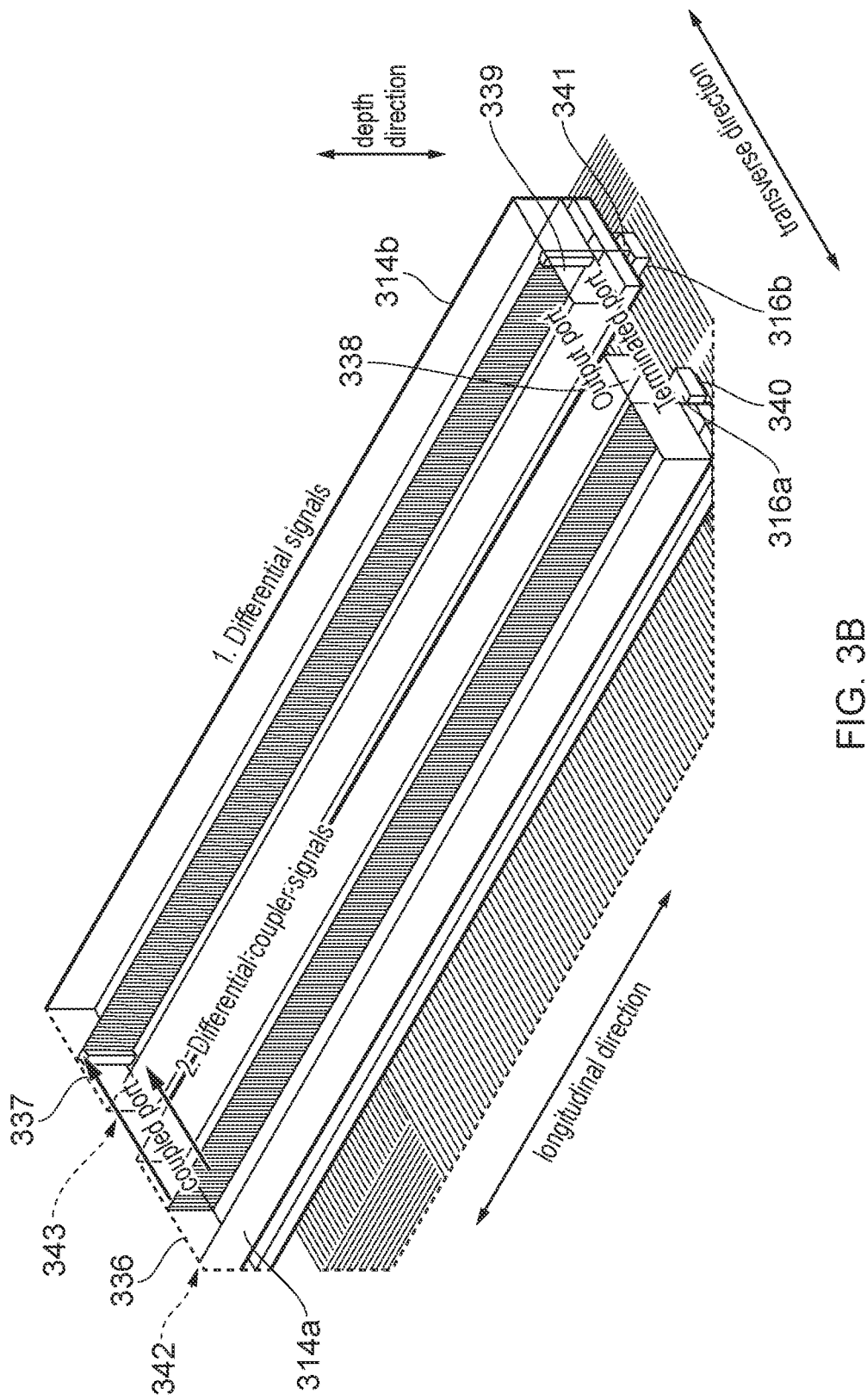
FIG. 3B shows a perspective top view of the differential signal coupler of FIG. 3A.

FIG. 3A shows a cross-sectional view of another example embodiment of a signal coupler 300 according to the present disclosure. FIG. 3B shows a perspective top-front view of the signal coupler 300 of FIG. 3A. Features of FIGS. 3A and 3B that are also shown in an earlier figure will be given corresponding reference numbers in the 300 series, and will not necessarily be described in detail again here.

In this example, the signal coupler 300 is for coupling differential signals. Therefore, the main-transmission-line 314 includes a positive-main-transmission-line 314a and a negative-main-transmission-line 314b, and the coupled-transmission-line 316 includes a positive-coupled-transmission-line 316a and a negative-coupled-transmission-line 316b.

A positive-input-port 336 is provided at a first end of the positive-main-transmission-line 314a. A negative-input-port 337 is provided at a first end of the negative-main-transmission-line 314b. (The first end of the positive-main-transmission-line 314a and the first end of the negative-main-transmission-line 314b are at the same end of the signal coupler 300.) The positive-input-port 336 and the negative-input-port 337 can be considered together as an input port of the signal coupler 300. That is, the input port of the signal coupler can comprise a pair of differential input ports.

A positive-output-port 338 is provided at a second end of the positive-main-transmission-line 314a, which is opposite to the first end. A negative-output-port 339 is provided at a second end of the negative-main-transmission-line 314b, which again is opposite to the first end. (The second end of the positive-main-transmission-line 314a and the second end of the negative-main-transmission-line 314b are at the same end of the signal coupler 300.) The positive-output-port 338 and the negative-output-port 339 can be considered together as an output port of the signal coupler 300. That is, the output port of the signal coupler can comprise a pair of differential output ports.

A positive-coupled-port 342 is provided at a first end of the positive-coupled-transmission-line 316a. A negative-coupled-port 343 is provided at a first end of the negative-coupled-transmission-line 316b. (The first end of the positive-coupled-transmission-line 316a and the first end of the negative-coupled-transmission-line 316b are at the same end of the signal coupler 300.) The positive-coupled-port 336 and the negative-coupled-port 337 can be considered together as a coupled port of the signal coupler 300. That is, the coupled port of the signal coupler can comprise a pair of differential coupled ports.

A positive-termination-port 340 is provided at a second end of the positive-coupled-transmission-line 316a, which is opposite to the first end. A negative-termination-port 341 is provided at a second end of the negative-coupled-transmission-line 316b, which again is opposite to the first end. (The second end of the positive-coupled-transmission-line 316a and the second end of the negative-coupled-transmission-line 316b are at the same end of the signal coupler 300.) The positive-termination-port 340 and the negative-termination-port 341 can be considered together as a termination port of the signal coupler 300. That is, the termination port of the signal coupler can comprise a pair of differential termination ports.

The positive-main-transmission-line 314a and the negative-main-transmission-line 314b are spaced apart from each other in the transverse direction, and are for conducting differential signalling. As shown in FIG. 3A, a dielectric material 344 is located between the positive-main-transmission-line 314a and the negative-main-transmission-line 314b in the transverse direction. The positive-coupled-transmission-line 316a and the negative-coupled-transmission-line 316b are for receiving coupled differential signalling from the main-transmission-line 314. More particularly, the positive-coupled-transmission-line 316a is located nearer the positive-main-transmission-line 314a than the negative-main-transmission-line 314b, such that signalling on the positive-main-transmission-line 314a is electromagnetically coupled to the positive-coupled-transmission-line 316a. Similarly, the negative-coupled-transmission-line 316b is located nearer the negative-main-transmission-line 314b than the positive-main-transmission-line 314a, such that signalling on the negative-main-transmission-line 314b is electromagnetically coupled to the negative-coupled-transmission-line 316b.

Figure 5:
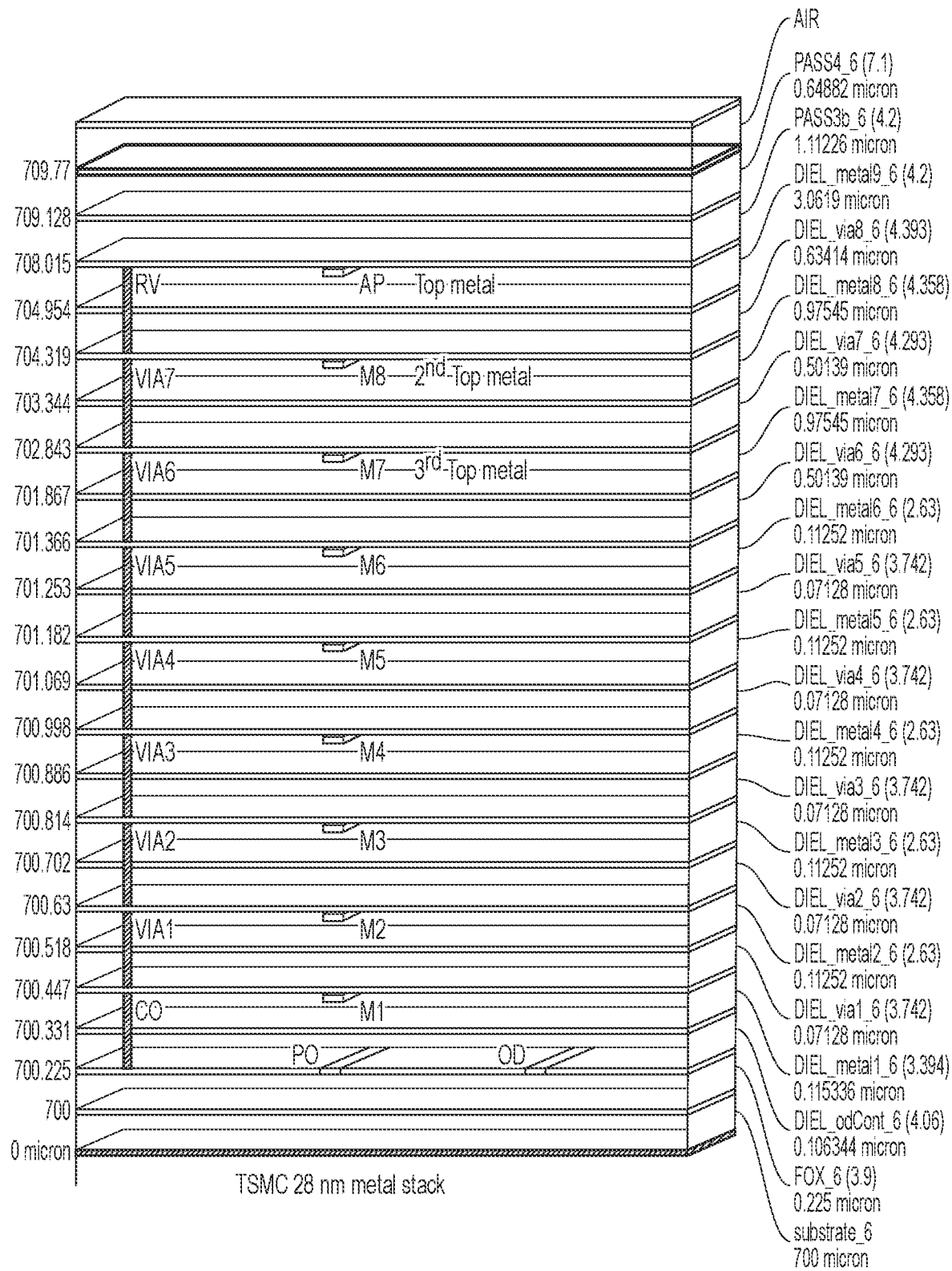
FIGS. 5 and 6 show a proof of concept of a microwave directional signal coupler in 28 nm pure CMOS technology.
Figure 5:
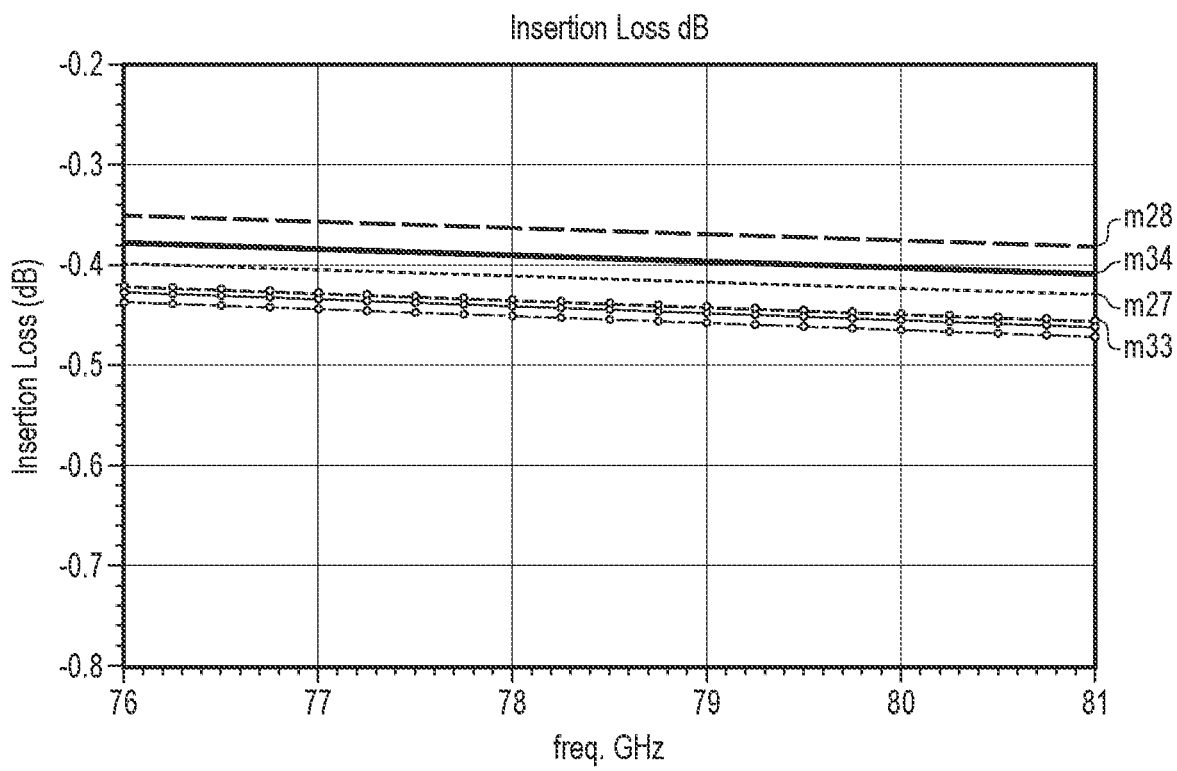

The positive-coupled-transmission-line 316a and the negative-coupled-transmission-line 316b are in the second layer, which in this example is an M8 layer. As shown in FIG. 5, the M8 layer is a $2^{nd}$ top metal layer in a silicon wafer.

The positive-main-transmission-line 314a and the negative-main-transmission-line 314b each comprise a first-sub-portion 320a, 320b, a second-sub-portion 322a, 322b and a third-sub-portion 324a, 324b.

The first-sub-portions 320a, 320b are in the first layer, which in this example is an AP layer. As shown in FIG. 5, the AP layer is an example of a top metal layer in a silicon wafer. The first-sub-portions 320a, 320b are spaced apart from the coupled-transmission-line 316 in the depth direction. The first-sub-portions 320a, 320b of the positive-main-transmission-line 314a and the negative-main-transmission-line 314b are spaced apart from each other in the transverse direction, with dielectric material in between in this example. In the transverse direction, the first-sub-portion 320a of the positive-main-transmission-line 314a overlaps the entire positive-coupled-transmission-line 316a. Also, in the transverse direction, the first-sub-portion 320b of the negative-main-transmission-line 314b overlaps the entire negative-coupled-transmission-line 316b.

The second-sub-portions 322a, 322b are in the second layer, which as discussed above is the M8 layer in this example. Each of the second-sub-portions 322a, 322b are each spaced apart from one side of the coupled-transmission-line 316 in the transverse direction in order to provide electromagnetic coupling between the main-transmission-line 314 and the coupled-transmission-line 316 in the transverse direction. The second-sub-portions 322a, 322b of the positive-main-transmission-line 314a and the negative-main-transmission-line 314b are spaced apart from each other in the transverse direction, with a dielectric material and the coupled-transmission-line in between in this example.

In the transverse direction, the second-sub-portion 322a of the positive-main-transmission-line 314a is spaced apart from an outward-facing-surface 332a of the positive-coupled-transmission-line 316a. The outward-facing-surface 332a of the positive-coupled-transmission-line 316a is in a plane that is parallel with the depth direction and the longitudinal direction, and faces the second-sub-portion 322a of the positive-main-transmission-line 314a. Also in the transverse direction, the second-sub-portion 322b of the negative-main-transmission-line 314b is spaced apart from an outward-facing-surface 332b of the negative-coupled-transmission-line 316b. The outward-facing-surface 332b of the negative-coupled-transmission-line 316b is in a plane that is parallel with the depth direction and the longitudinal direction, and faces the second-sub-portion 322b of the negative-main-transmission-line 314b.

The third-sub-portions 324a, 324b are in the third layer, which in this example is an M7 layer. As shown in FIG. 5, the M7 layer is an example of a $3^{rd}$ top metal layer in a silicon wafer. Each of the third-sub-portions 324a, 324b are spaced apart from a respective one of the positive-coupled-transmission-line 316a and the negative-coupled-transmission-line 316b in the depth direction in order to provide electromagnetic coupling between the main-transmission-line and the coupled-transmission-line in the depth direction.

The third-sub-portions 324a, 324b of the positive-main-transmission-line 314a and the negative-main-transmission-line 314b are spaced apart from each other in the transverse direction, with dielectric in between in this example. In the transverse direction, the third-sub-portion 324a of the positive-main-transmission-line 314a does not overlap with the positive-coupled-transmission-line 316a. Also in the transverse direction, the third-sub-portion 324b of the negative-main-transmission-line 314b does not overlap with the negative-coupled-transmission-line 316b. As discussed above, this can assist with the coupled-transmission-line 316 achieving sufficient coupling to the ground plane 318.

A first set of vias 326a provides a galvanic connection between the first-sub-portion 320a and the second-sub-portion 322a of the positive-main-transmission-line 314a. A second set of vias 326b provides a galvanic connection between the first-sub-portion 320b and the second-sub-portion 322b of the negative-main-transmission-line 314b.

A third set of vias 328a provides a galvanic connection between the second-sub-portion 322a and third-sub-portion 324a of the positive-main-transmission-line 314a. A fourth set of vias 328b provides a galvanic connection between the second-sub-portion 322b and third-sub-portion 324b of the negative-main-transmission-line 314b. In an alternative implementation, the third and fourth set of vias 328a, 328b can provide a galvanic connection directly between the first-sub-portions 320a and the third-sub-portion 324a of the respective positive-main-transmission-line 314a and the negative-main-transmission-line 314b in order to achieve the same result of the first-, second- and third-sub-portions 320a, 320b, 322a, 322b, 324a, 324b being galvanically connected together.

The signal coupler 300 of FIG. 3 can be provided as a microwave directional coupler, which comprises a first differential microstrip transmission line (the main-transmission-line 314) having an input port 336, 337 and an output port 338, 339, and a second differential transmission line (the coupled-transmission-line 316) electromagnetically coupled to the first transmission line and having a coupled port 342, 343 and a terminated port (which is another name for the termination-port 340, 341 that is described above). The signal coupler 300 advantageously combines a broadside-coupled structure by using a relatively thick first layer (in this example the AP layer) over the coupled-transmission-line 316 in the second layer (the M8 layer in this example), with edge-coupling of the second-sub-portions 322a, 322b (in the M8 layer in this example) and the third-sub-portions 324a, 324b (in the M7 layer in this example) of the main-transmission-line 314 that are outside (in the transverse direction) of the coupled-transmission-line 316.

Figure 4A:
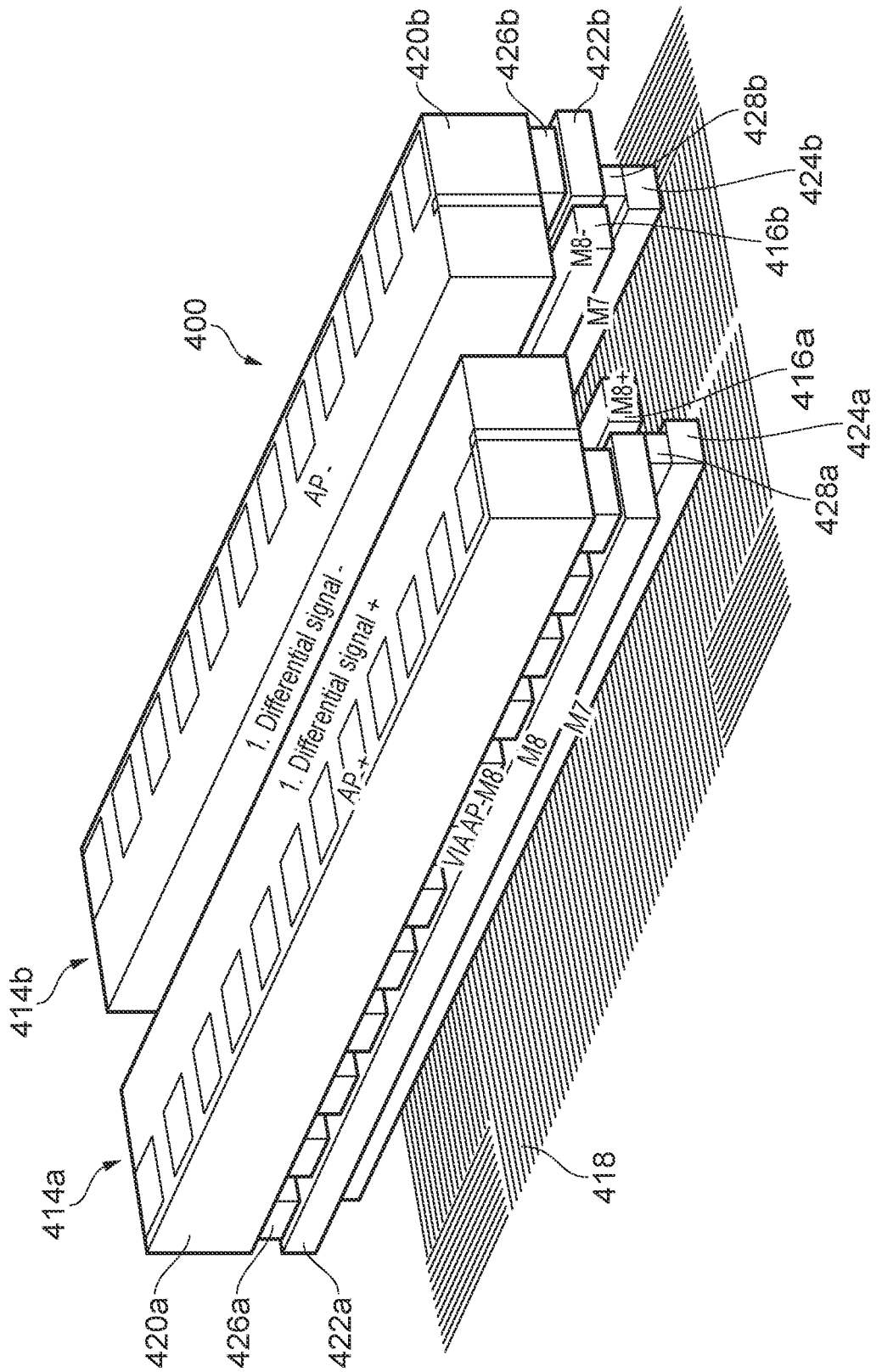
FIG. 4A shows a perspective top-front view of some parts of an example embodiment of a differential signal coupler.

FIG. 4A shows a perspective view of some parts of an example embodiment of a signal coupler 400. In particular, FIG. 4A shows a positive-main-transmission-line 414a, a negative-main-transmission-line 414b, a positive-coupled-transmission-line 416a and a negative-coupled-transmission-line 416b. These transmission lines are arranged in a layout that is similar to the layout that is described with reference to FIGS. 3A and 3B. FIG. 4A also shows a ground plane 418 that is spaced apart from the transmission lines. For ease of illustration, dielectric material, which can be located around and between the transmission lines, has been omitted from FIG. 4A.

In the same way as discussed above, the positive-main-transmission-line 414a and the negative-main-transmission-line 414b each include: a first-sub-portion 420a, 420b, a second-sub-portion 422a, 422b and a third-sub-portion 424a, 424b. A first set of vias 426a provides a galvanic connection between the first-sub-portion 420a and the second-sub-portion 422a of the positive-main-transmission-line 414a. A second set of vias 426b provides a galvanic connection between the first-sub-portion 420b and the second-sub-portion 422b of the negative-main-transmission-line 414b.

A third set of vias 428a provides a galvanic connection between the second-sub-portion 422a and third-sub-portion 424a of the positive-main-transmission-line 414a. A fourth set of vias 428b provides a galvanic connection between the second-sub-portion 422b and third-sub-portion 424b of the negative-main-transmission-line 414b.

FIG. 4B shows a perspective view of the following features of FIG. 4A: the third set of vias 428a, the third-sub-portion 424a of the positive-main-transmission-line 414a, the fourth set of vias 428b, and the third-sub-portion 424b of the negative-main-transmission-line 414b.

FIG. 4C shows a plan view of the features of FIG. 4B.

As shown in FIGS. 4B and 4C in particular, each of the third sub-portions 424a, 424b include a longitudinally extending section 452 and a plurality of transversely extending fingers 450. Implementing the third-sub-portions 424a, 424b in this way can advantageously further reduce the signal transmission loss and enhance the coupling factor, while still enabling the transmission lines to be kept relatively short.

The fingers 450 extend in a transverse direction inwardly, away from the longitudinally extending section 452. As shown in the FIGS. 4B and 4C, the fingers 450 extend towards a transverse centre of the signal coupler 400. In this way, the fingers 450 of the third-sub-portion 424a of the positive-main-transmission-line 414a extend towards the third-sub-portion 424b of the negative-main-transmission-line 414b. Similarly, the fingers 450 of the third-sub-portion 424b of the negative-main-transmission-line 414b extend towards the third-sub-portion 424a of the positive-main-transmission-line 414a.

When the components of FIGS. 4A-4C are included in a substrate (that is omitted from these figures for ease of illustration), the fingers are separated from each other by a dielectric material.

In this example, in the transverse direction, the fingers 450 of the third-portions 424a, 424b do not overlap the positive-coupled-transmission-line 416a or the negative-coupled-transmission-line 416b.

The third set of vias 428a and the fourth set of vias 428b can be galvanically connected to the longitudinally extending sections 452 of the respective third sub-portions 424a, 424b, as shown in FIGS. 4B and 4C.

In the same way as described with reference to FIGS. 3A and 3B, in FIGS. 4A-4C the top thickest AP metal layer is used for the first-sub-portions 420a, 420b of the positive-main-transmission-line 414a and the negative-main-transmission-line 414b for differential signal transmission. The first-sub-portions 420a, 420b in the AP layer contact the second and third top-layers M8 and M7 through VIAS that are on the outer sides of the positive-coupled-transmission-line 416a and the negative-coupled-transmission-line 416b. In this way the differential E-field concentrates in the region between conductors with only some fraction being underneath the positive-coupled-transmission-line 416a and the negative-coupled-transmission-line 416b. Whereas the electromagnetic coupling field distributes via AP, M8 and M7 from the outmost sides of the positive-coupled-transmission-line 416a and the negative-coupled-transmission-line 416b that half-surround each of the positive-coupled-transmission-line 416a and the negative-coupled-transmission-line 416b.

In this example, the transverse width of the third-sub-portions 424a, 424b is designed such that it is narrower than not only the first-sub-portions 420a, 420b in the AP layer, but also the second sub-portions 422a, 422b in the M8 layer. The following dimensions are shown in FIG. 4C: L—the transverse length of the fingers 450; W—the longitudinal width of the fingers 450; and d the transverse separation distance between adjacent fingers 450. These dimensions can beneficially be used to fine-tune the directivity of the coupler, and also to reduce undesirable variations of coupling factor by using multiple metals in small pieces (the fingers) instead of a whole piece.

Figure 6:
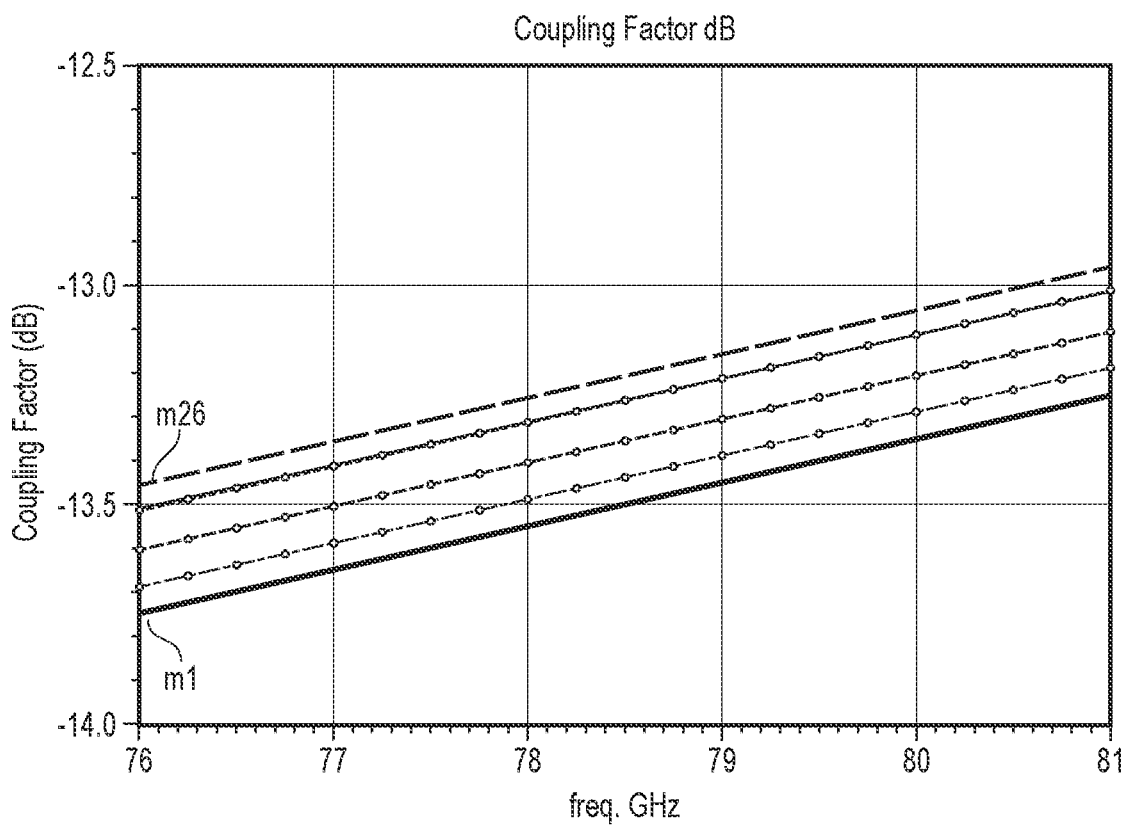
Figure 6:
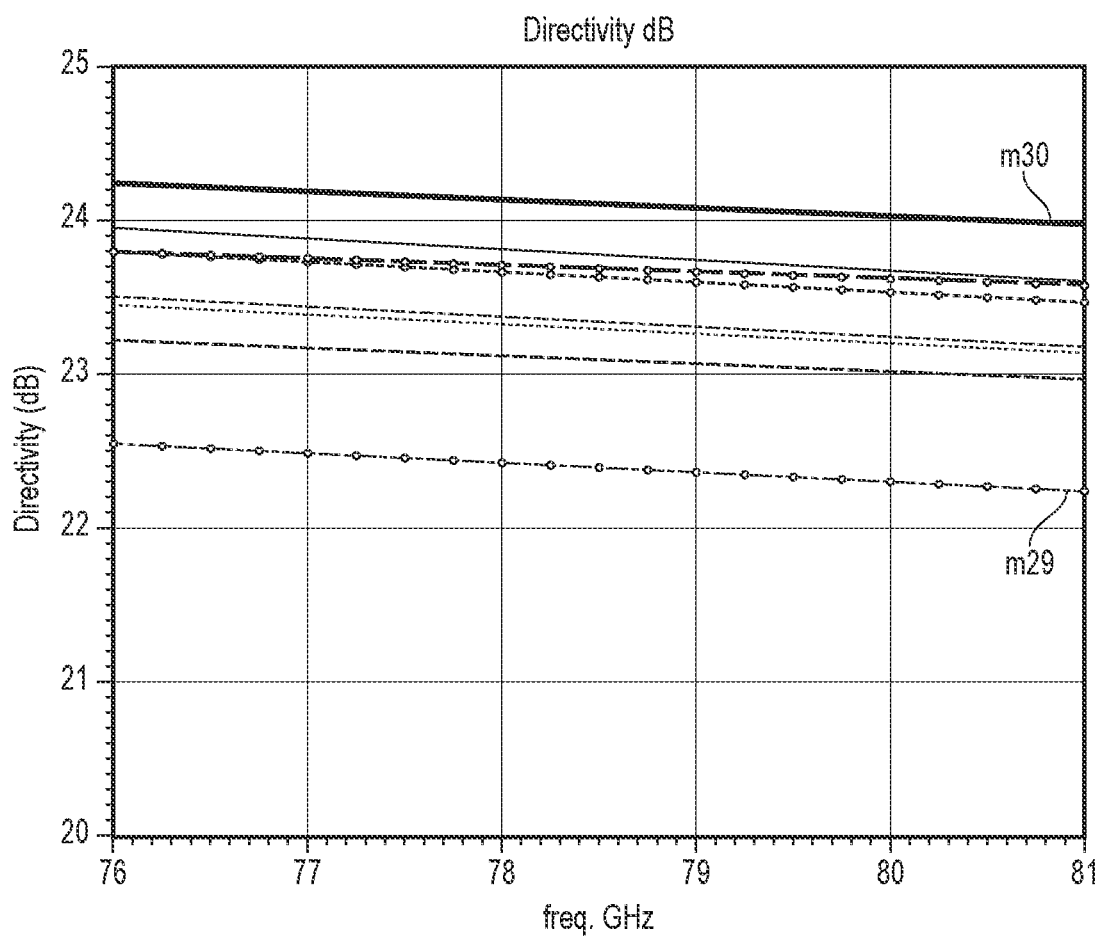

FIGS. 5 and 6 show a proof of concept of a microwave directional signal coupler in 28 nm pure CMOS. The left-hand side of FIG. 5 shows the various layers in a silicon wafer that are used to implement the signal coupler. The right-hand side of FIG. 5 shows that the insertion loss is sufficiently small when coupling frequencies between 76 and 81 GHz. The left-hand side of FIG. 6 shows that the coupling factor is sufficiently good over the same frequency range. The right-hand side of FIG. 6 shows that the directivity is sufficiently good over the same range of frequencies.

FIGS. 5 and 6 show that examples of the signal coupler that are described herein are suitable for coupling high frequency signals. In this context, high frequencies can be greater than RF frequencies, for example greater than 300 MHz. The signal couplers can be suitable for even higher frequencies, such as greater than 1 GHz, 10 GHz or 50 GHz. Examples described herein can be especially suitable for coupling microwave frequencies in the range of 1 GHz to 1000 GHz, and even higher frequencies.

Examples disclosed herein relate to a differential directional microwave coupler with multilayer microstrip structures. Such a differential microwave directional coupler includes a first differential transmission line having a differential input port and a differential output port, and a second differential transmission line having a differential coupled port and a differential terminated port. The microwave directional coupler has a small size for a given operating frequency with a high directivity by utilizing no space-consuming discrete capacitor, or distributed open stub capacitors, but only distributed metal-to-metal coupling capacitors from both differential transmission lines.

The signal couplers are suitable for use with any microwave product using high-directivity, high coupling factor with a small space.

In one implementation there is a provided a novel differential microwave coupler consisting two differential transmission lines (TLs): one for signal transmission, one for the signal coupling, which achieves a high coupler factor of −15 dB and high coupler directivity of 24 dB with only a size of 100 µm×40 µm in advanced multilayer CMOS technology. The signal transmission loss is less than 0.5 dB. The first TL as signal line comprises top metal layer, second and third Top layers M8 and M7 and corresponding VIAS to connect all layers together at outmost site. The second differential TL as coupler line is in layer M8. The coupler combines a broadside-coupled structure by using thick top layer (AP) as signal transmission over second top layer (M8) as coupler and an edge-coupled structure by using second and third conductor layers M8 and M7 outermost of the coupler. The high directivity and low variation of the coupler can be optimized by adjusting the geometry of the lower conductor layer pattern from the transmission conductor layers.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:
1. A signal coupler comprising:
 a substrate having a first surface and an opposite second surface, and defining a thickness therebetween, wherein the substrate comprises:
  a depth direction that is through the thickness of the substrate;
  a longitudinal direction that is orthogonal to the depth direction;
  a transverse direction that is orthogonal to the depth direction, and is also orthogonal to the longitudinal direction;
  a first layer;
  a second layer that is located between the first layer and the second surface; and
  a third layer that is located between the second layer and the second surface;
 an input port;
 an output port;
 a coupled port;
 a termination port;
 a main-transmission-line that extends in the longitudinal direction within the substrate between the input port and the output port; and
 a coupled-transmission-line that extends in the longitudinal direction within the substrate between the coupled port and the termination port;
 wherein:
  the main-transmission-line and the coupled-transmission-line are electromagnetically coupled to each other;
  the coupled-transmission-line is in the second layer; and
  the main-transmission-line comprises a first-portion in the first layer, a second-portion in the second layer, and a third-portion in the third layer, wherein the first-portion, the second-portion and the third-portion are galvanically connected together, such that:
   at least part of the first-portion of the main-transmission-line is spaced apart from the coupled-transmission-line in the depth direction in order to provide electromagnetic coupling between the main-transmission-line and the coupled-transmission-line;

at least part of the second-portion of the main-transmission-line is spaced apart from the coupled-transmission-line in the depth direction in order to provide electromagnetic coupling between the main-transmission-line and the coupled-transmission-line; and at least part of the third-portion of the main-transmission-line is spaced apart from the coupled-transmission-line in the depth direction in order to provide electromagnetic coupling between the main-transmission-line and the coupled-transmission-line.

2. The signal coupler of claim 1, wherein the substrate further comprises:
a ground plane that is parallel with the first surface, and is located between the third layer and the second surface.

3. The signal coupler of claim 1, wherein, in the transverse direction:
the first-portion of the main-transmission-line at least partially overlaps the coupled-transmission-line.

4. The signal coupler of claim 3, wherein, in the transverse direction:
the first-portion of the main-transmission-line overlaps the entire coupled-transmission-line.

5. The signal coupler of claim 1, wherein, in the depth direction:
the second-portion of the main-transmission-line overlaps the entire coupled-transmission-line.

6. The signal coupler of claim 1, wherein, in the depth direction:
the main-transmission-line overlaps the entire coupled-transmission-line, and also extends beyond the coupled-transmission-line in both: a direction towards the first surface of the substrate; and a direction towards the second surface of the substrate.

7. The signal coupler of claim 1, wherein, in the transverse direction:
at least part of the third-portion of the main-transmission-line does not overlap the coupled-transmission-line.

8. The signal coupler of claim 1, wherein:
the second-portion of the main-transmission-line comprises two second-sub-portions that are respectively spaced apart from opposite sides of the coupled-transmission-line in the transverse direction in order to each provide electromagnetic coupling between the main-transmission-line and the coupled-transmission-line; and
the third-portion of the main-transmission-line comprises two third-sub-portions that are spaced apart from opposite sides of the coupled-transmission-line in the transverse direction.

9. The signal coupler of claim 1, wherein:
the main-transmission-line comprises:
a positive-main-transmission-line and a negative-main-transmission-line that are spaced apart from each other in the transverse direction, and are for conducting differential signalling;
the coupled-transmission-line comprises:
a positive-coupled-transmission-line and a negative-coupled-transmission-line for receiving coupled differential signalling from the main-transmission-line;
the positive-coupled-transmission-line and the negative-coupled-transmission-line are in the second layer, and are spaced apart from each other in the transverse direction;
the positive-main-transmission-line and the negative-main-transmission-line each comprise:
a first-sub-portion in the first layer, that is spaced apart from the coupled-transmission-line in the depth direction;
a second-sub-portion in the second layer that is spaced apart from one side of the coupled-transmission-line in the transverse direction in order to provide electromagnetic coupling between the main-transmission-line and the coupled-transmission-line;
a third-sub-portion in the third layer that is spaced apart from a respective one of the positive-coupled-transmission-line and the negative-coupled-transmission-line in the depth direction in order to provide electromagnetic coupling between the main-transmission-line and the coupled-transmission-line.

10. The signal coupler of claim 8, wherein each of the third sub-portions include a longitudinally extending section and a plurality of transversely extending fingers.

11. The signal coupler of claim 10, wherein the fingers extend in a transverse direction inwardly, away from the longitudinally extending section.

12. The signal coupler of claim 10, wherein:
the fingers of the third-sub-portion of the positive-main-transmission-line extend towards the third-sub-portion of the negative-main-transmission-line; and
the fingers of the third-sub-portion of the negative-main-transmission-line extend towards the third-sub-portion of the positive-main-transmission-line.

13. The signal coupler of claim 10, when they depend from claim 9, wherein in the transverse direction, the fingers of the third-portions do not overlap the positive-coupled-transmission-line or the negative-coupled-transmission-line.

14. The signal coupler of claim 1, wherein the substrate comprises a silicon wafer or a multi-layer printed circuit board.

15. The signal coupler of claim 1, wherein the signal coupler is suitable for coupling signals having a frequency that is greater than 300 MHz.

16. A radar system comprising:
a signal coupler comprising:
a substrate having a first surface and an opposite second surface, and defining a thickness therebetween, wherein the substrate comprises:
a depth direction that is through the thickness of the substrate;
a longitudinal direction that is orthogonal to the depth direction;
a transverse direction that is orthogonal to the depth direction, and is also orthogonal to the longitudinal direction;
a first layer;
a second layer that is located between the first layer and the second surface; and
a third layer that is located between the second layer and the second surface;
a main-transmission-line that extends in the longitudinal direction within the substrate between an input port and an output port; and
a coupled-transmission-line that extends in the longitudinal direction within the substrate between a coupled port and a termination port;
wherein:

the main-transmission-line and the coupled-transmission-line are electromagnetically coupled to each other;

the coupled-transmission-line is in the second layer; and the main-transmission-line comprises a first-portion in the first layer, a second-portion in the second layer, and a third-portion in the third layer, wherein the first-portion, the second-portion and the third-portion are galvanically connected together, such that:

at least part of the first-portion of the main-transmission-line is spaced apart from the coupled-transmission-line in the depth direction in order to provide electromagnetic coupling between the main-transmission-line and the coupled-transmission-line;

at least part of the second-portion of the main-transmission-line is spaced apart from the coupled-transmission-line in the depth direction in order to provide electromagnetic coupling between the main-transmission-line and the coupled-transmission-line; and at least part of the third-portion of the main-transmission-line is spaced apart from the coupled-transmission-line in the depth direction in order to provide electromagnetic coupling between the main-transmission-line and the coupled-transmission-line.

17. The radar system of claim 16, wherein the substrate further comprises:

a ground plane that is parallel with the first surface, and is located between the third layer and the second surface.

18. The radar system of claim 16, wherein, in the transverse direction:

the first-portion of the main-transmission-line at least partially overlaps the coupled-transmission-line.

19. The radar system of claim 16, wherein, in the depth direction:

the second-portion of the main-transmission-line overlaps the entire coupled-transmission-line.

20. The radar system of claim 16, wherein the signal coupler is configured for coupling signals having a frequency that is greater than 300 MHz.

\* \* \* \* \*